3,278,325
REFLECTORIZED MARKING MATERIAL AND METHOD OF MAKING SAME

Samuel E. Wissinger, Jr., Huntingdon, Pa., assignor to Prismo Safety Corporation, Huntingdon, Pa., a corporation of Pennsylvania
No Drawing. Filed May 28, 1963, Ser. No. 283,678
11 Claims. (Cl. 117—27)

This invention relates to reflectorized glass spheres and more particularly to a method of coating glass spheres with a reflectorized coating and the resulting spheres.

Reflectorized glass spheres are commonly used in reflex-reflective marking, particularly in signs, wherein reflectively coated glass spheres are partially embedded in a binder material. After the binder material has solidified, the reflective coating is removed from the exposed spheres by abrasion or by washing with a suitable acid. There are several disadvantages to this method of reflectorizing. First of all, the previous methods of reflectivly coating the glass spheres are expensive and require special apparatus. Secondly, the method of removal of the exposed reflective coating is difficult.

Accordingly, it is an object of the present invention to provide a novel method of making reflectively coated glass spheres.

It is a further object of the present invention to provide a novel reflectivly coated glass spheres having an easily removable reflective coating thereon.

A still further object of the present invention is to provide a reflective marker utilizing these novel reflectively coated spheres.

It is a further object of the present invention to provide novel reflectively coated glass spheres having an easily removable reflective coating thereon.

According to the present invention, glass spheres of a size which are customarily used in highway and sign markers are coated with metal powder held onto the glass spheres by a water soluble binder. The water soluble binder will solidify and retain the metal powder on the glass spheres yielding a stable reflectorized product that can be shipped in commerce without loss of the reflectorizing coating yet when desired, the coating, or any part thereof, can be readily removed by washing with water.

These coated beads can be expelled from a spray gun or a glass sphere dispenser in the usual manner onto a wet paint coating such as a traffic line, a sign, or other reflective marker. After the paint or other binder has set, the exposed reflective coated surfaces of the spheres sticking out of the paint line or sign can be readily removed by washing with a stream of water. The metal powder can be readily removed because it is held onto the glass spheres only by the water soluble binder material. The metal powder and binder on the back of the spheres embedded in the paint layer will remain bonded to the glass since the binder on the sphere is insoluble in the binder in the paint layer. The metal powder held onto the back of the spheres may thus be utilized for increasing the light return very significantly.

The glass spheres contemplated for use in this invention are preferably in the range of 0.5–50 mils in diameter and preferably of a relatively high refractive index, e.g., approximately 1.92, so that maximum reflectivity is obtained from the reflectively coated surface on the underside of the spheres.

The metal powder may be any high luster powder such as tin, alumimun, gold, silver, chromium, copper, bronze, magnesium, and the like, although tin and aluminum are preferred. The metal powder should be of a particle size which does not exceed $\frac{1}{10}$ of the diameter of the glass spheres used. If the metal powder particles are too large they will not coat the tiny glass spheres which are in the order of ½–50 mils in diameter.

The water soluble binder may be any suitable binder which is soluble in water and yet insoluble in the paint binder, such as polyvinyl acetate, polyvinyl alcohol, latex, dextrines, starches, sodium silicate, and other water soluble silicates and silicones. The binder may be any suitable water soluble resins, resin emulsions and adhesives.

The percentage of binder utilized depends on the size of the glass spheres and the particle size of the metal powder.

There are two methods of coating of the glass spheres that can be employed. The glass spheres can be added to the binder and the mass kept agitated until the glass spheres are coated with the binder and dried until tacky. The metal particles are then added to the tacky glass spheres followed by completing the drying of the coated glass spheres.

A second method consists of forming a thick paste of the binder and the metal powder followed by adding the glass spheres and agitating until the spheres are well coated and the coating has dried thereon.

In either method of coating, the glass spheres must be constantly rotated or agitated the curing process to prevent the spheres from sticking together. The resulting product must be free flowing.

Glass spheres coated in accordance with this invention can also be used in the preparation of silvered reflective spheroids as described in co-pending application Ser. No. 61,998, filed October 11, 1960, entitled "Reflective Spheroids." These spheroids comprise spherical solidified cores of a thermosetting resin having a plurality of reflectively coated glass spheres partially embedded and completely covering the outer surfaces thereof. Using the beads of the present invention, the exposed reflectively coated surfaces of the glass spheres can be treated with water to remove the exposed reflective surfaces. This eliminates the necessity for the use of nitric acid or the like as has previously been required with the commercially available silvered glass spheres.

The glass spheres coated in accordance with the present invention can also be used in making the reflective granules which are described in co-pending application Ser. No. 173,638, filed February 16, 1962, entitled "Reflective Granules."

Typical examples of the invention are as follows:

Example I

An excess of glass spheres is added to 5 parts of a solution of 2% polyvinyl alcohol in water with continuous agitation. When the glass spheres have become coated and the coating is tacky, 10 parts of powdered tin are added with continued agitation until the binder has solidified and the coated glass spheres are free flowing.

The reflectively coated spheres obtained were partially embedded in an alkyd paint. After the paint had solidified, the exposed reflective coating on the upper surfaces of the spheres was easily removed by applying a stream of warm water.

Example II 100 parts of glass spheres known as "sign glass" were added to a mixer. 100 parts of 0.5% polyvinyl acetate solution in water were added with agitation until the binder was tacky, at which time 100 parts of fine aluminum powder were added with continued agitation until fully cured and free flowing.

After partially embedding these coated spheres in a partially cured paint film, the exposed spheres were washed with a 3% acetic acid in water solution. The thin films of binder on the outside surfaces of the spheres were solubilized and washed away.

The proportions of ingredients are not critical so long as good reflectivity is obtained. With an excess of glass spheres, the proportions of the coating may be varied as follows:

| | Percent |
|---|---|
| Binder | 10–90 |
| Metal powder | 10–90 |

Especially good results have been obtained when the proportions are as follows:

| | Percent |
|---|---|
| Binder | 33–67 |
| Metal powder | 33–67 |

The amount of glass spheres will vary depending upon the size of the spheres, since the amount of surface to be coated varies with the diameter of the spheres. A relatively thin coating of binder is preferred for ease in removal.

Although cold water will remove the water soluble binders, in some cases warm water of 140–160° F. is desirable and in other cases a weak acetic acid solution may be used.

It will be obvious to those skilled in the art that various changes may be made without departing from the scope of the invention and therefore the invention is not limited to what is described in the specification but only as indicated in the appended claims.

What is claimed is:

1. Glass spheres for use in reflecting marking comprising free flowing small glass spheres all-over coated with high luster metal powder retained on the surface of said glass spheres by a water soluble binder material, the metal powder particle size being of the order of not exceeding $\frac{1}{10}$ the diameter of the glass spheres.

2. Glass spheres in accordance with claim 1, wherein the binder material is polyvinyl alcohol.

3. Glass spheres in accordance with claim 1, wherein the binder material is polyvinyl acetate.

4. Glass spheres in accordance with claim 1, wherein the binder material is a water soluble adhesive.

5. A method of making retro-reflective markers which comprises dropping coated glass spheres onto a wet paint layer, said glass spheres being coated with a high lustre metal powder retained thereon by a water soluble binder material; solidifying said paint layer so that the coated glass spheres are partially embedded therein; and removing the coating from the exposed surfaces of the glass spheres by washing it away with water.

6. A method in accordance with claim 5 wherein the binder material is polyvinyl alcohol.

7. A method in accordance with claim 5 wherein the binder material is polyvinyl acetate.

8. A method in accordance with claim 5 wherein the binder material is a water soluble adhesive.

9. A method in accordance with claim 5 wherein the metal powder particle size does not exceed $\frac{1}{10}$ the diameter of the glass spheres.

10. A method of making coated glass spheres which comprises agitating glass spheres with a water soluble binder material until the glass beads are evenly coated with the binder material, continue agitating until the coating dries and becomes tacky, adding finely divided high lustre powdered metal and continuing agitation until the tacky spheres are evenly coated with the metal powder, and drying to obtain free flowing reflectively coated glass spheres wherein the coating can be washed away with water.

11. A method of making coated glass spheres which comprises agitating glass spheres with a mixture of a water soluble binder material and finely divided high lustre powdered metal and continuing agitation until the glass spheres are evenly coated, and drying with continued agitation to obtain free flowing reflectively coated glass spheres wherein the coating can be washed away with water.

References Cited by the Examiner
UNITED STATES PATENTS

| 2,440,584 | 4/1948 | Heltzer et al. | 117—100 |
| 2,963,378 | 12/1960 | Palmquist et al. | 117—100 |
| 3,025,764 | 3/1962 | McKenzie | 117—100 |
| 3,176,584 | 4/1965 | De Vries et al. | 117—127 |

WILLIAM D. MARTIN, *Primary Examiner.*

S. W. ROTHSTEIN, *Assistant Examiner.*